July 22, 1969     W. L. ROLLER     3,456,785
SCREEN APPARATUS

Filed Aug. 11, 1965     3 Sheets-Sheet 2

INVENTOR.
WILFERD L. ROLLER
BY John A. Young
his Attorney

July 22, 1969     W. L. ROLLER     3,456,785
SCREEN APPARATUS

Filed Aug. 11, 1965     3 Sheets-Sheet 3

INVENTOR.
WILFERD L. ROLLER
BY John A. Young
his Attorney

United States Patent Office 3,456,785
Patented July 22, 1969

3,456,785
SCREEN APPARATUS
Wilfred L. Roller, 3854 Baytree St.,
Pittsburgh, Pa. 15214
Filed Aug. 11, 1965, Ser. No. 478,906
Int. Cl. B03b 3/06
U.S. Cl. 209—17                                     7 Claims

ABSTRACT OF THE DISCLOSURE

This invention is a separation apparatus in which the materials are separated by first screening the material with an incline guide which handles the flow and including drainage provisions at the upper and lower ends of the guide. The screen is adjustable to vary the pitch and the material is washed as it moves across the screen, with the chamber for receiving the drainage and the wash flow as the two flows pass over the sluice screen.

---

This invention relates to a screen apparatus which is used in combination with a separatory vessel and its associated mechanism, for such applications as coal washing, mineral classification, and other such separation operations wherein materials are separated on the basis of their different specific gravities.

In many mineral classification systems, the raw material is fed into a separatory vessel having a separatory medium of carefully adjusted specific gravity. The specific gravity of the medium is intermediate the constituents being separated so that one will float and the other will sink within the medium and the materials which are thereby separated are separately collected and removed from the separatory vessel. The system as described, requires a systematic withdrawal of the two materials and with such withdrawal of materials is a removal of the separatory medium which must, for economical operations, be returned to the separatory vessel and if necessary, be concentrated or adjusted so that it is of a proper specific gravity such that the specific gravity of the medium within the vessel remains substantially constant. If the specific gravity of the medium changes, this will likewise change its affect on separating the two materials, thereby reducing the quality of the separation.

It was the usual practice in the prior art to convey the materials from the separatory vessel to vibrating screens which would drain the medium and cause it to be returned to the separatory vessel. By vibrating the screens, the materials thereon were caused to travel along the length of the screen. In order to remove any residual amount of medium which would either cling or adhere to the surface of the separated materials it was the practice to spray the materials with a quantity of wash water which would remove all of the medium; the washed, diluted mixture was then suitably concentrated before return to the separatory vessel.

It has been found, that a system of vibrating screens is not only expensive but also requires numerous adjustments because of the fact that various materials which were classified differ in specific gravity and size and each dictates a different vibrating rate and amplitude for optimum results. Consequently, such vibrating screens have proved to be generally unsatisfactory because of need for adjustment, because of power requirements for such a screen and because of the high initial expense for providing such machines, in addition to the expense for its operation.

In the present invention, there is proposed a novel screen arrangement which eliminates the requirement for vibrating the screen and provides instead, a static screen.

It is a further object of the present invention to provide a novel adjustable screen which, according to its pitch, can be adjusted for the specific gravity, size and friction coefficient of the material being separated.

It is a further object of the present invention to provide a novel means for readily adjusting the pitch of the screen so that it can readily be adapted for the classification of different kinds of materials.

It is an important feature of the present invention that there can be used a combination of screens, each with a different pitch or with the same pitch according to the conditions of operation, and that at least one of said screens can be provided with a flow of water which washes any residual flotation medium off of the materials before their final discharge.

It is an important object of the present invention to provide in combination with a separatory system, a novel screening arrangement which can be adjusted for the particular material being separated and thereafter used without external power requirements to provide thereby an inexpensive, efficient, screening means in combination with a mineral separation system.

The above and other objects and features of the invention will become apparent from a consideration of the following description, which proceeds with reference to the accompanying drawings, wherein.

Figure 1:
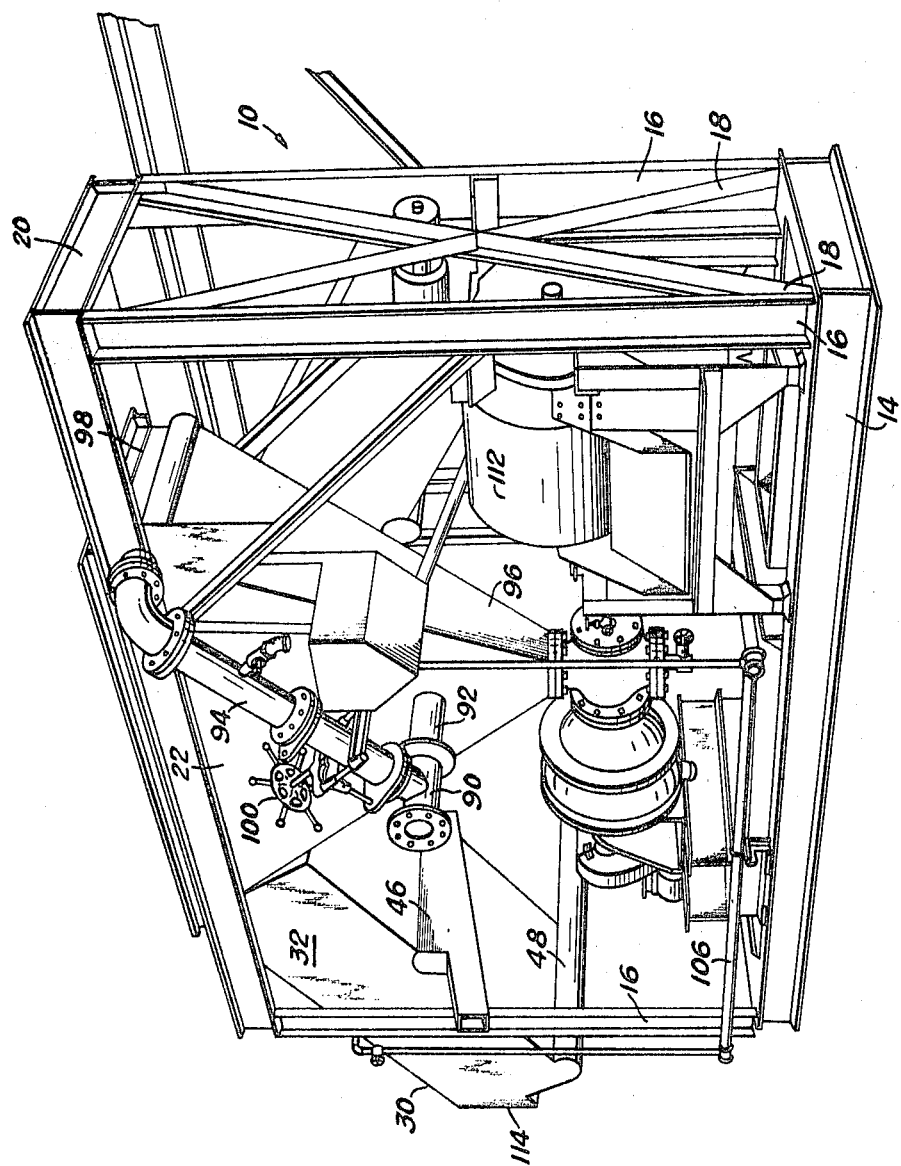
FIGURE 1 is a perspective view of a separatory apparatus incorporating the present invention therein.
Figure 2:
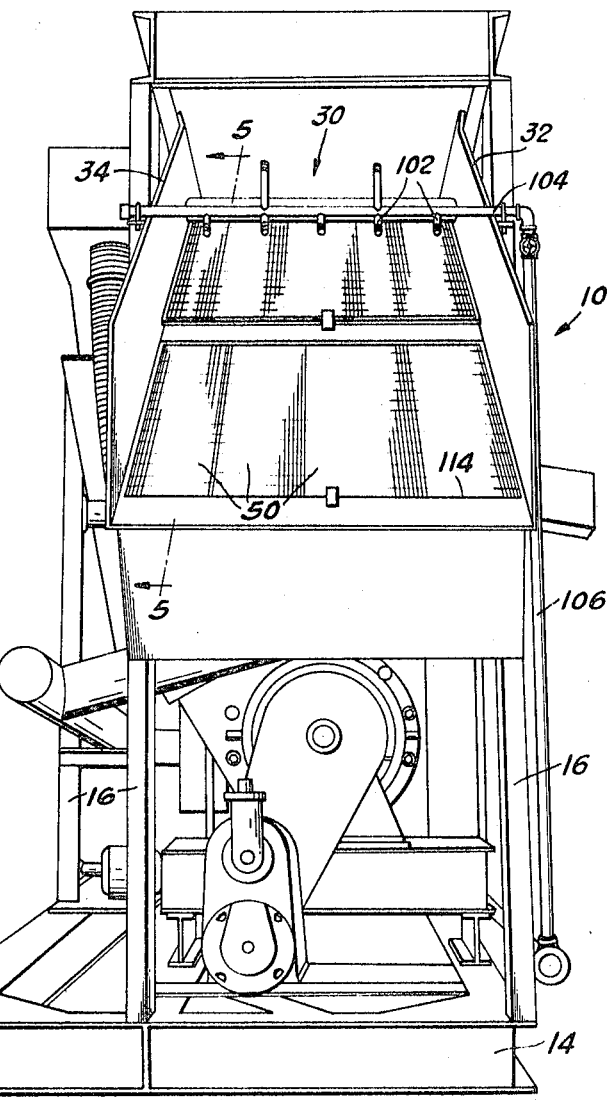
FIGURE 2 is a further perspective view of the apparatus from the discharge end thereof and illustrating the screens and spray apparatus for removing the separatory medium.
Figure 3:
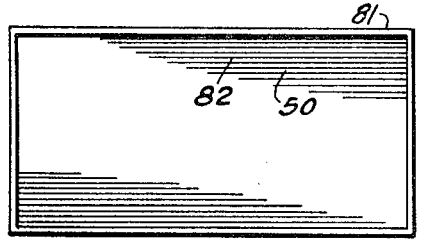
FIGURE 3 illustrates one of the screens shown removed from the support illustrated in FIGURE 2.

Referring now to the drawings, the apparatus for effecting coal washing, gravel washing, mineral classification, etc., is portable and is designated generally by reference numeral 10 (FIGURES 1 and 2). The apparatus is supported within a frame including the rectangular base 14, vertical members 16 having reinforcing cross braces 18 and a rectangular system of beams 20 which interconnect the upper ends of the vertical member 16 to form a rigid boxlike structure for supporting the apparatus 10. The apparatus 10 is readily transportable and can be mounted on the flat bed of a carrier truck (not shown) for transportation to the place of use. The apparatus 10 includes a separatory vessel 22 which receives a flow of the material intended for separation and contains a separatory medium such as magnetite or the like which is adjusted in its specific gravity in order to effect a separation of the inflow of materials on the basis of the different specific gravities. That is, the separatory medium is adjusted to be intermediate the specific gravity of the materials intended for separation so that one material will sink and the other material will float and can thereby be separated on the basis of the sink-and-float characteristics in the fluid medium. The materials which are thus separated are separately removed.

Figure 4:
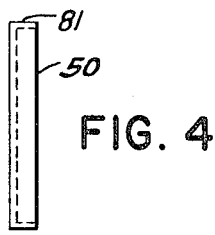
FIGURE 4 is an end view of the individual screen viewed from the right hand end of FIGURE 3.

As the separated material is discharged, it is passed into a chute designated generally by reference numeral 30 (FIGURES 1, 2) having spaced side walls 32, 34, which channels the discharged materials in a generally downward direction. The chute provides support ledges 38, 40, and a partitioning wall 42 which separates the chute 30 into two spaced sections. At the bottom or base 44 are semicircular openings 46, 48, one on each side of the partition 42 to collect the liquid phase separatory medium which drains off of the coal or other material and passes through panel screens 50 (FIGURES 2, 4).

Figure 5:
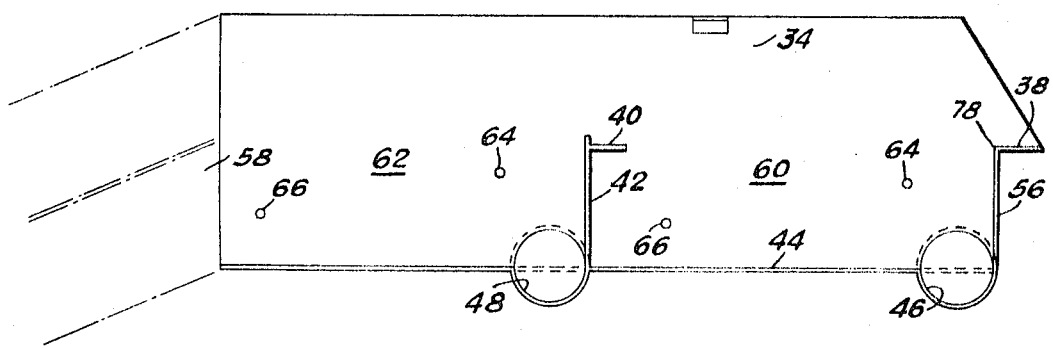
FIGURE 5 is an elevation view of the screen mounting structure, with the screens removed and the view being taken on line 5—5 of FIGURE 2.
Figure 6:
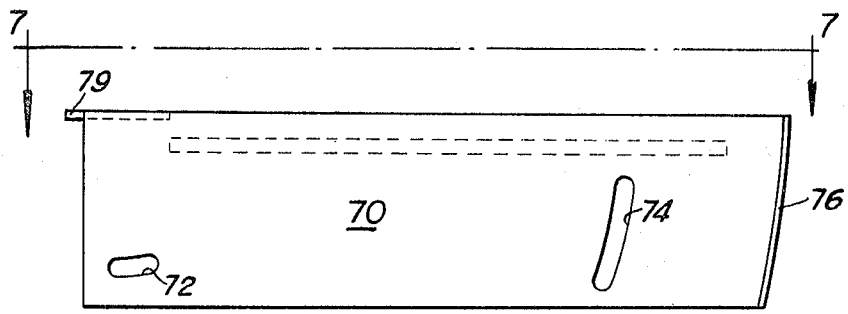
FIGURE 6 is a side elevation of the support platform for the screens and which regulates and defines the pitch of the screen whereon the separated material moves.

Referring to FIGURE 5), the sheet metal sides 30, 32, the base 44, entry panel 56 and exit panel 58, define the fluid containing sections 60, 62, which are separated by the partition 42. Within each compartment 60, 62, is a pair of spaced openings 64, 66, which provide for adjustable mounting of platform 70 (FIGURE 6) therein. Platform 70 has a first opening 72 which is combined with opening 66 and an arcuate second opening 74 combined with opening 64, there being a bolt or other fastener which is passed through the opening 64 which is alignable with 74 and another fastener which is passed through opening 66 alignable with 72 whereby the platform 70 can be disposed at whatever angle is desired within compartment 60. Platform 70 has a rounded end 76 which bears against edge 78 (FIGURE 5) of the chute 30 and has a flange 79 which bears against 40 this being the pivot point about which the platform 70 is adjusted and thereafter clamped in place by the spaced bolt (not shown) received through aligned coacting openings 66–72 and openings 64–74.

Once the platform 70 is adjusted for the proper angularity, the screen panels 50 which rest on the platform 70 are likewise adjusted. A number of screen panels 50 are provided for each platform, typically about four in number which rest on flanges 78 and 79.

Figures 7, 8:
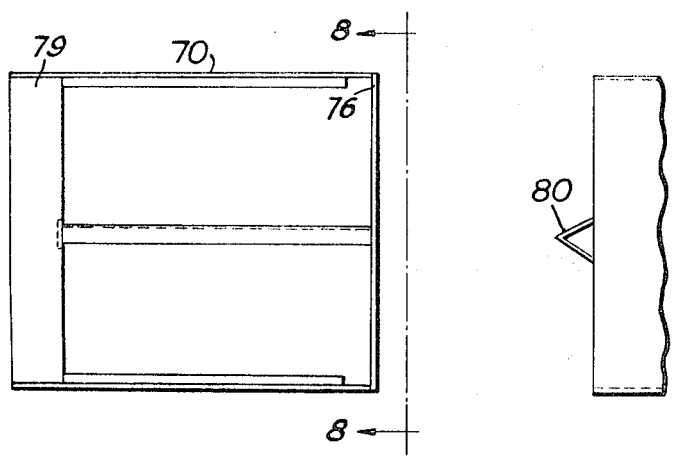
FIGURE 7 is a reduced size top view of the support structure of FIGURE 6 looking in the direction of the arrows 7—7.
FIGURE 8 is an end view of the structure shown in FIGURE 7 looking in the direction of the arrows 8—8.

The screens are inclusive of border members 81 and a suitable wear resistant grid 82 which is of a fine enough mesh to prevent the material from dropping through while at the same time permitting drainage of the flotation medium. In order to facilitate raising and lowering of the support platform 70, there is a hook 80 (FIGURE 8) which can be connected to a lift means (not shown) to effect pivoting of the platform 70 about the engagement of flange 79 with 40 (FIGURE 5). Once the appropriate angularity is obtained the bolts are then tightened to form a secure fastening of the sides 77 of the platform 70 with sides 32 and 34 through openings 64 and 66. The bolts (not shown) can be tightened from the outside of the apparatus and likewise loosened to permit change in pitch or angularity of the screens 50.

As shown in FIGURE 2, there are two sluice screen sections, the initial section at the upper end of the chute being adapted to drain off the flotation material which is received into compartment 60 and directly returned to the separation tank through line 46. Since the concentration of the medium initially drained off is of the same density as the flotation medium found in the separatory vessel, no adjustment need be made of its specific gravity and it can be directly returned to the separatory vessel.

The line 90 transferring medium to the separatory vessel (FIGURE 1) has branch lines 92 and 94 at the base 96 and the upper end 98 of the separatory vessel and are used for two distinct flows. The flow from compartment 60 is directly combined with these flows. The purpose of having two return lines is that the one return flow of flotation material is to meet the incoming flow of raw material for separation and the lower vessel inlet flow is to provide a circulatory flow for the flotation material internally of the separatory vessel 22 to maintain a substantially even or uniform specific gravity. Valve 100 is usable for proportioning the two flows.

In the lower section of the sluice screens (FIGURE 2), a flotation medium is washed off of the separated material by a spray of water emanating from spaced nozzles 102 which are all commonly connected with a line 104 which receives water from a suitable supply line 106. In this case, the flotation medium is diluted by the wash water which is directed over the material and the dilute flotation medium drained into compartment 62 is received in line 48 and is first passed through a concentrator 112 before returning to the separatory vessel.

At the time the separated material is discharged from the bottom end 114 of the chute (FIGURES 1, 2) all of the separatory medium has been removed and has been thoroughly washed.

Depending upon the size of the material being separated, its specific gravity, its coefficient of friction and its rate of flow, the screens can be suitably adjusted to the appropriate pitch. Once the pitch is established, the apparatus can continue to function and will discharge thoroughly washed and separated material without significant loss of the flotation medium. It is, of course, essential to economical operation that none of the flotation medium be unnecessarily removed, but instead, be recirculated as the need requires. There is no need for mechanically agitating the screens, suitable separation and rate of movement of the material is satisfactory depending upon the adjusted pitch of the screens. If the rate of movement is too great, then the pitch is reduced; the flow rate of the material can be speeded up by making the pitch steeper, all of this being accomplished by loosening the bolts passing through openings 64–74 and openings 66–72, adjusting the pitch of the platform 70 and supported screens, and then re-tightening the bolts, all this being accomplished from the exterior of the apparatus. The support platform is easily gripped by means of the lifting handle 80 and effecting the angular or pitch position as needed.

Because of the absence of motors, agitating equipment, etc., the operation is more economical both in the original equipment and to operate and because of its adjustability, it produces highly satisfactory operation.

I claim:

1. In a separation apparatus having a separatory vessel for containing a separation medium adapted to receive a flow of materials for separation, means for separating the separatory medium from the flow of separated product, comprising: an inclined guide means having side walls for channeling the flow of separated material, a base located between said sides and providing support surfaces, two vertically spaced drainage means sealed apart and located at the upper and lower ends respectively of said inclined guide means, sluice screen means, means cooperatively associated with said side walls for adjustably varying the pitch of said screen means within said guide means, means for washing the material as it moves across said screen means, and chamber means for receiving the drainage and wash flow from the materials as they pass over said sluice screen means.

2. In a separation apparatus having a separatory vessel for containing a separation medium adapted to receive a flow of materials for separation, means for separating the separatory medium from the flow of separated product, comprising: an inclined guide means having side walls for channeling the flow of separated material, a base located between said sides and providing support surfaces, two vertically spaced drainage means sealed apart and located at the upper and lower ends respectively of said inclined guide means, sluice screen means, means cooperatively associated with said side walls for adjustably varying the pitch of said screen means within said guide means, means for washing the material as it moves across said screen means, chamber means for receiving the drainage and wash flow from the materials as they pass over said screen means, and means for recirculating the flow of material drained from said materials.

3. Apparatus for use in combination with separatory operations such as coal washing, gravel washing, mineral classification and the like, comprising guide means having side walls for channeling a flow of material intended for separation, mounting means including a support base, at least one screen having a border which is proportioned to be in engagement at its outer periphery with said support base lateral support means permitting a build-up of material which is carried over the surface of the screen along a generally downward path over the surface thereof, means cooperatively disposed one at each end of said screen and in combination with said side walls for adjustably defining the slope of said screen in its operative position within said guide means, and a collection chamber for receiving the drainage from the material passing over said screen and disposed at a lower level than said screen in general vertical alignment therewith.

4. In a separation apparatus for classifying minerals, washing coal, gravel and the like, the structure comprising: means for receiving a flow of the classified or washed material and forming a chute having a support base and two side walls thereon and extending in a generally downward sloping direction, means for supplying a flow of the separated or classified material to said chute, support means received within said chute and proportioned to fill substantially the cross section thereof, at least one screen mounted on said support means to be located within said chute between said side wall and supported vertically therein, and means cooperatively associated with the side walls of said chute for adjusting the pitch of said support means and said screen within the chute in accordance with the character and rate of movement of the material which are supplied thereto, said adjusting means including means for pivotally supporting one portion of said screen and a clamping element for securing the screen at its preselected angular position.

5. In a separation apparatus for classifying minerals, washing coal, gravel and the like, the structure comprising: means for receiving a flow of the classified or wash material, and forming a chute having a base and two side walls thereon and extending in a generally downward sloping direction, means for supplying a flow of the separated or classified material to said chute, at least one screen mounted within said chute between said side walls and supported vertically therein, means for adjusting the pitch of said screen within the chute in accordance with the character and rate of movement of the materials which are supplied there to, said adjusting means including means for pivotally supporting one portion of said screen and a clamping element for securing the screen at its preselected angular position on its pivot mounting, and an arcuate track having guide surfaces which locate the angular position for said screen as it pivots about its pivot center and is thereafter clamped at the preselected angular position therefor.

6. In a separation apparatus for classifying minerals, washing coal, gravel and the like, the structure comprising: means for receiving a flow of the classified or washed material, and forming a chute having a base and two side walls thereon and extending in a generally downward sloping direction, means for supplying a flow of the separated or classified material to said chute, at least one screen mounted within said chute between said side walls and supported vertically therein, means cooperatively associated with said side walls for adjusting the pitch of said screen within the chute relatively to said base in accordance with the character and rate of movement of the materials which are supplied thereto, said adjusting means including means for pivotally supporting one portion of said screen, and a clamping element for securing the screen at its preselected angular position upon said pivotally mounting supporting means, a receiving chamber for collecting the material which is drained from the screen, and conduit means within said chamber to withdraw for recirculation a flow of the drained material which passes through said screen.

7. An apparatus for classifying minerals, washing coal and the like, comprising: a screening apparatus, underlying means for supporting said screen, a chute including side walls, a base and a collecting chamber, at least one screen mounted on said supporting means within said chute, adjustable means combined with said side walls and said screen for defining the pitch of said screen within said chute in accordance with the characteristics and rate of movement of said material, and clamping means for retaining said screen in its adjusted position within said chute.

References Cited
UNITED STATES PATENTS

| | | | |
|---|---|---|---|
| 161,147 | 3/1875 | O'Brien | 209—314 |
| 1,279,630 | 9/1918 | Hagerty et al. | 209—354 X |
| 1,294,309 | 2/1919 | Rowand | 209—354 |
| 2,600,508 | 6/1952 | Lehman et al. | 209—354 |
| 2,817,439 | 12/1957 | Teuteberg | 209—172.5 |
| 2,893,557 | 7/1959 | Teuteberg | 209—172.5 |
| 3,084,796 | 4/1963 | Skolnik | 209—172.5 X |
| 3,246,749 | 4/1966 | Moser | 209—172.5 X |
| 3,363,769 | 1/1968 | Wilmot et al. | 209—405 X |

TIM R. MILES, Primary Examiner

U.S. Cl. X.R.

209—172.5, 354, 404